United States Patent [19]

Geronime

[11] 4,290,314
[45] Sep. 22, 1981

[54] TARGET FLOWMETER

[75] Inventor: Robert L. Geronime, Rosemount, Minn.

[73] Assignee: Rosemount Inc., Eden Prairie, Minn.

[21] Appl. No.: 28,575

[22] Filed: Apr. 9, 1979

[51] Int. Cl.³ ............................................. G01F 1/40
[52] U.S. Cl. ................................................. 73/861.52
[58] Field of Search .................... 73/205 R, 211, 212, 73/228, 861.52, 861.61, 861.65

[56] References Cited

U.S. PATENT DOCUMENTS

| | | | |
|---|---|---|---|
| 948,872 | 2/1910 | Clark | 73/212 |
| 1,295,046 | 2/1919 | Lohnes | 73/861.67 |
| 1,560,664 | 11/1925 | Cole | 73/861.67 |
| 2,687,645 | 8/1954 | Velten et al. | 73/211 |
| 3,355,946 | 12/1967 | Lazell | 73/861.65 |
| 3,449,954 | 6/1969 | Brown | 73/861.65 |
| 3,683,693 | 8/1972 | Brown | 73/861.65 |
| 3,998,097 | 12/1976 | Akashi et al. | 73/211 |
| 4,008,611 | 2/1977 | Turocy | 73/205 |
| 4,024,762 | 5/1974 | Roberts, Jr. | 73/228 |
| 4,154,100 | 5/1979 | Harbaugh | 73/212 |

Primary Examiner—Herbert Goldstein
Attorney, Agent, or Firm—Kinney, Lange, Braddock, Westman and Fairbairn

[57] ABSTRACT

A flowmeter comprising a disc-like target member mounted in a flow conduit and which forms an obstruction to flow. The meter includes means to measure the differential in pressure on opposite faces of the target or obstruction body to determine the flow rate as a function of such differential in pressure.

10 Claims, 4 Drawing Figures

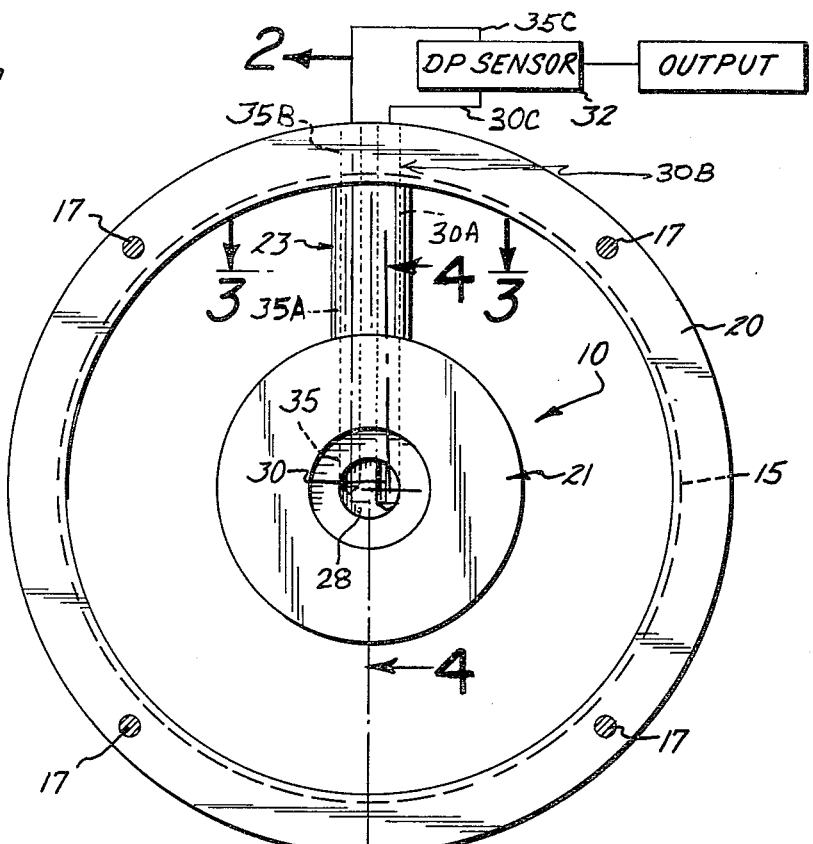
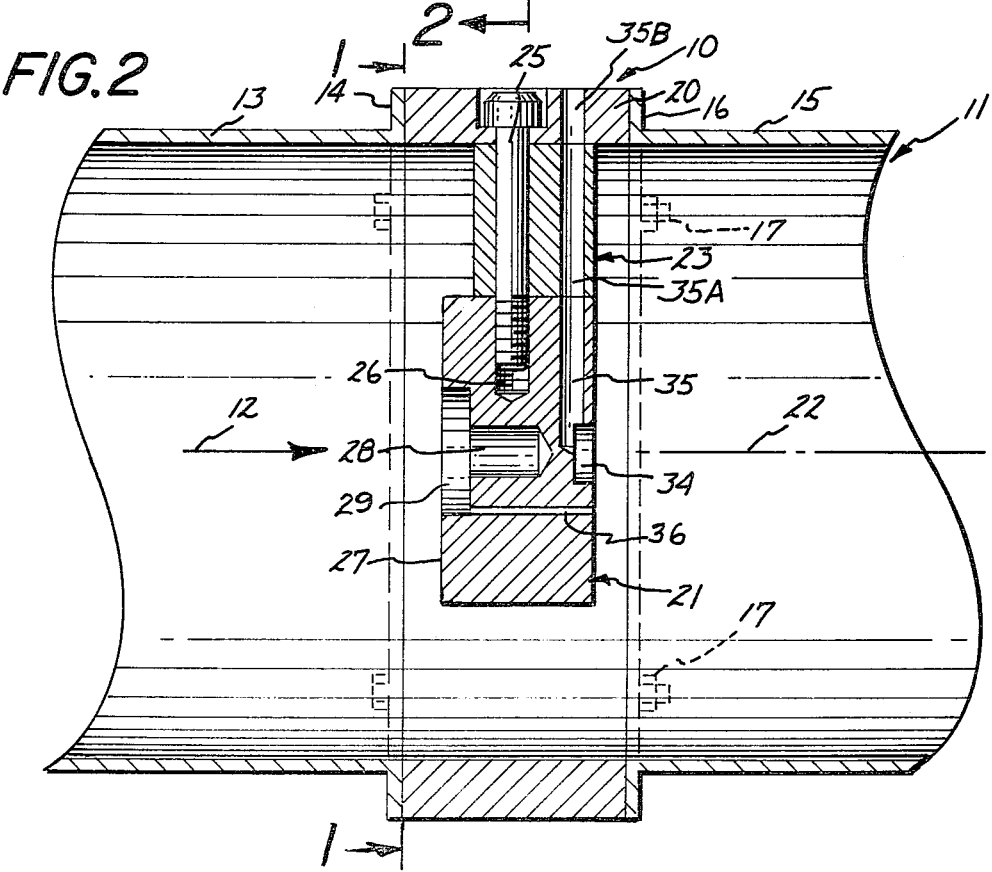

TARGET FLOWMETER

BACKGROUND OF THE INVENTION

1. Field of the Invention

The present invention relates to measurement of flow in a conduit or duct as a function of the differential in pressure between two faces of a body mounted in the conduit.

2. Prior Art

It has long been known that flow of a fluid past an obstruction causes a disruption in the flow, and tends to create a force on the body. Target flowmeters which include means to measure the force have been known. Also, orifice plates have been used to measure flow. In aircraft the difference in pressure of an upstream facing port (pitot pressure) and the undisturbed air pressure (static pressure) has also long been used to determine airspeed of an aircraft.

SUMMARY OF THE INVENTION

The present invention relates to a flowmeter for determining the flow rate of fluids within a conduit comprising a target or flow obstruction body of a selected configuration that is positioned within the conduit, and further including means to measure the differential in pressure between the upstream facing surface and the downstream facing surface of the body. A flat, disc-like body is disclosed, having a plane which is generally perpendicular to the flow through the conduit, and having a length parallel to flow direction that is relatively short in relation to the conduit diameter. Generally speaking the area of the target as measured transverse to the flow direction can be selected in relation to the conduit size to obtain a satisfactory pressure differential, and at the same time insure that there is adequate remaining area for the volume of flow that is desired past the flow obstruction body.

In the form shown the target or flow obstruction body is mounted with a suitable strut that extends from an annular ring held between flanges of the conduit. The body can be mounted securely with respect to the wall of the conduit in any desired manner. Generally speaking it is desirable to have a uniform width space around the periphery of the body and the interior surface of the conduit. For example if a circular cross section conduit is used, a circular target or obstruction body is desirable. In general it is found that a circular flow obstruction body having a diameter approximately one-half the diameter of the conduit provides adequate response without adversely affecting flow. If a rectilinear conduit is utilized, either a round or rectilinear shaped target or flow obstruction body could be utilized.

While the device shown herein has provision for remote measurement of the differential pressure, it is to be noted that a differential pressure sensing cell could form the target and could be placed directly in the flow conduit with one of the actuating diaphragms facing upstream and the other downstream, and then the differential pressure measured directly by such a cell. For example, a differential pressure sensing cell similar to that shown in FIG. 4 of U.S. Pat. No. 3,618,390 may be found to be suitable. Further, the pressure sensor shown in that patent, together with suitable readout circuitry, can be connected to the sensing ports of the flow obstruction body of the present invention for measuring the differential pressure. For example, the circuitry of FIG. 2 of U.S. Pat. No. 3,854,039 may be used to obtain a linear output signal representation of the flow in the flow conduit.

The flow obstruction bodies are relatively easy to make, and provide suitable indication of flow by differential in pressures for various liquids and other fluids. The target flowmeter is relatively insensitive to slight misalignment in mounting, and this simplifies the mounting structure and installation procedures. The accuracy is acceptable, and it has been further found that the rounding or scoring of edges of the flow obstruction body during use does not affect results as seriously as in orifice plates, for example.

BRIEF DESCRIPTION OF THE DRAWINGS

FIG. 1 is a front elevational view of a target flowmeter of the present invention viewed in direction along the flow axis of a conduit taken on line 1—1 in FIG. 2;

FIG. 2 is a sectional view of the device of FIG. 1 taken generally along line 2—2 in FIG. 1;

DESCRIPTION OF THE PREFERRED EMBODIMENT

Figure 3:
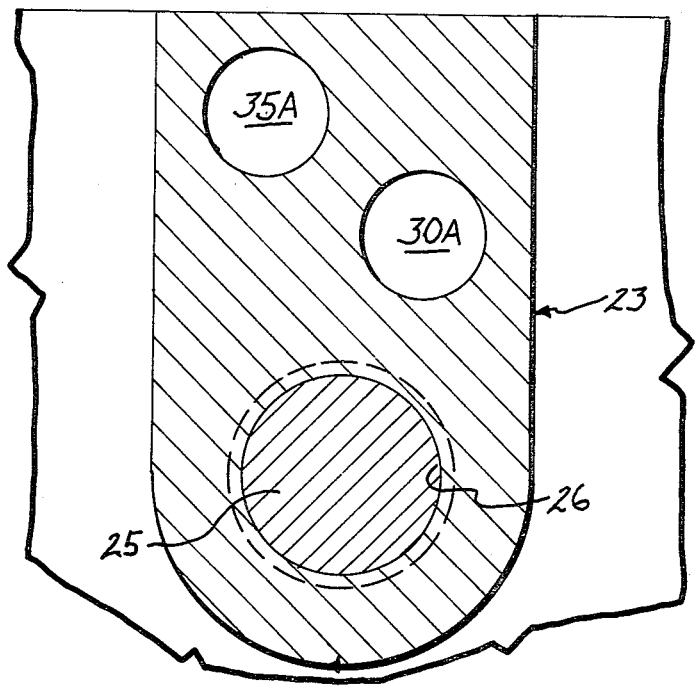
FIG. 3 is a sectional view taken generally along line 3—3 in FIG. 1.

Referring to the drawings, a target type flow-meter of the present invention illustrated generally at 10, as shown, is mounted in a flow conduit indicated generally at 11 which has a fluid such as water flowing in the direction that is indicated by the arrow 12 in FIG. 2. The conduit is divided into sections, and as shown a first section 13 is an upstream section and has a flange 14 or pipe coupling, and a second section 15 has a flange 16 thereon. The flowmeter assembly 10 is mounted between these flanges and is fastened in place with suitable bolts 17 extending through openings or apertures in the flanges and in the outer body of the flowmeter assembly in a normal manner.

The flowmeter assembly thus comprises a relatively heavy external ring 20, which in the form shown has the same internal diameter as the conduit sections 13 and 15, and which defines a conduit through which the fluid will flow. The flowmeter further includes a flow obstruction body indicated generally at 21 that is, as shown, centered on the central axis of the conduits 13 and 15 (and of ring 20). The central axis is shown in FIG. 2 at 22.

The target or flow obstruction body 21 is a disc-like member having a circular front face which corresponds to the circular cross section of the conduit sections 13 and 15. In this embodiment the flow obstruction body 21 has an outer diameter approximately one-half the internal diameter of the conduit. It is believed that the ratio of the flow facing area of flow obstruction body 21 to the internal cross sectional area of the conduit preferably is less than 0.64. When body 21 and the conduit are circular in cross section the ratio of the diameter of body 21 to the internal diameter of the conduit preferably is less than 0.8. This provides an adequate space or opening between the periphery of the flow obstruction body 21 and the internal surface of the conduit for flow past the obstruction body. The flow obstruction body has a length in the direction of flow approximately one-fourth the diameter of the conduit, which will be called the flow obstruction body length. As shown, it is supported with at least one strut indicated at 23 positioned on the interior diameter of the ring 20 to provide support for the target or flow obstruction body 21. The target or flow obstruction body may be supported in any desired way.

The strut 23 is held in place by passing a cap screw 25 through a suitable opening in the strut and threading it into the target itself, as shown at 26, and thus supporting the target through the cap screw portion and actually clamping the strut relative to the outer ring 20. Support for the target may also be provided by a strut formed from the same block of material which also forms the target. If desired, of course additional support can be provided.

Figure 4:
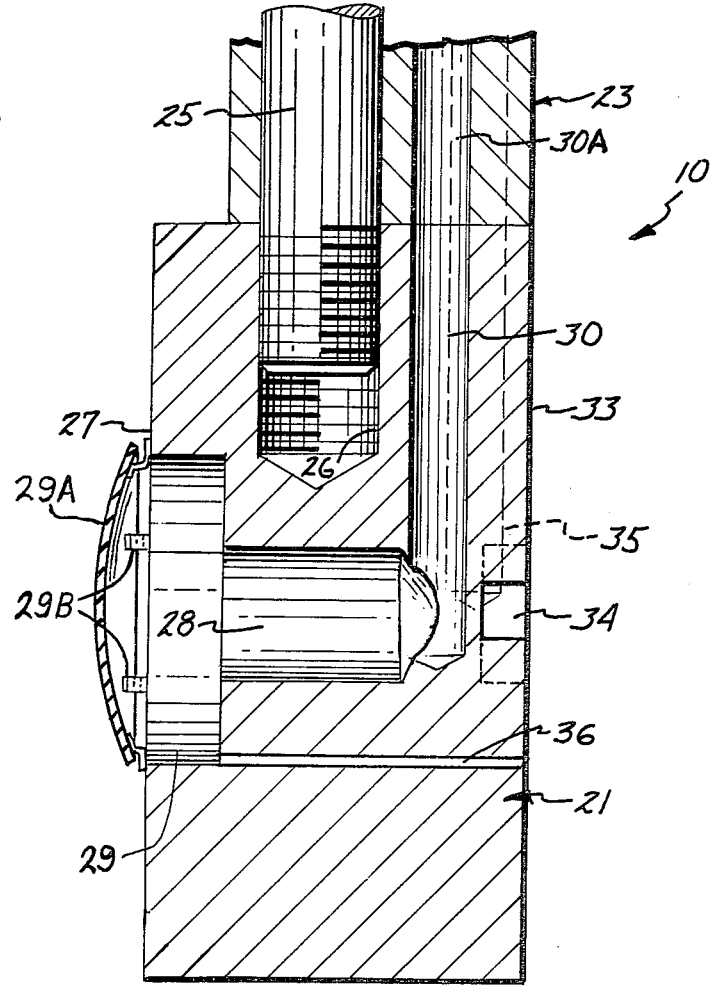
FIG. 4 is a fragmentary enlarged sectional view taken as on line 4—4 in FIG. 1.

The flow obstruction body or target 21, as shown, has a counterbore indicated at 29 on the upstream face 27 thereof which extends inwardly in direction along the length of the body 21 a desired amount, and this counterbore leads to a smaller inner bore 28 that extends axially a little over half the length of the target or flow obstruction body. As shown in FIG. 4 a pressure sensing bore or passageway 30 is provided in the flow obstruction body 21. The pressure sensing bore 30 opens to the upstream opening bore portion 28. Thus pressure in the counterbore 29 and the bore 28 will be sensed at the bore or passageway 30. The bore 30 is open through a bore portion 30A in the strut 23 and through an aligning passageway 30B in ring 20. A suitable conduit 30C is connected to bore portion 30B and in turn leads to one side of a differential pressure sensor indicated generally at 32. The bore 30, therefore carries pressure equivalent to a pitot pressure, generated by the pressure head of the flow past the flow obstruction body 21. A particle deflector 29A supported by a plurality of spaced mounting fingers 29B preferably is supported on target 21 for use in fluids having entrained solids to reduce particle buildup and erosion caused by particle impingement.

This pressure is sensed by use of the differential pressure sensor in relation to the pressure on the back face 33 of the flow obstruction body. As shown, a counterbore 34 is provided on the back face and a pressure sensing bore 35 (see FIG. 2) is open to counterbore 34 and extends radially out from the bore 34 through the flow obstruction body 21. Bore 35 mates with a bore portion 35A in the strut 23. The bore portion 35A is open through a bore portion 35B in the annular ring, and to a conduit 35C which leads to the opposite side of the differential pressure sensor 32. Note that counterbore 34 and bore 28 do not join each other. The body 21 is substantially imperforate to flow in that most of the flow passes around the body. The differential in pressure between the pressures sensed at the upstream face 27 and the downstream face 33 of the flow obstruction body is sensed by the differential pressure sensor 32, and the output signal from the differential pressure sensor is a function of the pressure differential. A small passageway 36 between counterbore 29 and the bore 34 or back face 33 may be included to provide purging.

The flowmeter includes a target or flow obstruction body on the interior of a conduit which is of sufficient size in relation to the conduit to result in a differential in pressure at the upstream and downstream facing surfaces as a result of flow. The pressure differential can be measured to provide an indication of the flow past the target. The target is also selected in size to permit a desired flow through the conduit without excessive pressure heads.

The strut used for mounting the target is rounded at its leading edge to tend to minimize turbulence. The leading edge of the flow obstruction body or target 21 itself is preferably sharp. However, tests have shown that slightly rounded edges on the target do not adversely affect operation. It is desirable to prevent major cavitation around the target, so that the target size in relation to the flow should be selected to minimize cavitation, but the shedding of stable vortices may be helpful.

Further, it has been found that slight rotation of the target or flow obstruction body, that is, twisting so that the plane of the body is not exactly perpendicular to the axis of flow, does not adversely affect the sensing. The results from slight rotation or cocking primarily show a difference because of a difference in the forward projected surface of the target.

The device provides for a relatively simple construction for measuring flows utilizing an obstruction body in the flow and means for measuring the differential in pressure between the upstream face or surface and the downstream face surface. The pressure sensing capsule can be directly inserted into the flow if desired so that the differential in pressure is sensed directly by changes occurring in this obstruction body itself, such as the deflection of a diaphragm mounted in the obstruction body. Suitable circuitry would provide sensing.

The purge passageway 36 is small so that substantial flow does not pass through. Yet particles of dirt and the like which are suspended or entrained in the fluid and which enter counterbore 29 may be moved by pressure differentials through the passageway and discharged downstream. The target or flow obstruction body 21 is considered substantially imperforate to flow as long as sufficient flow is made to pass around the body to cause a satisfactory differential in pressure between the upstream and downstream faces or surfaces.

What is claimed is:

1. A flowmeter for determining flow of a fluid stream in a conduit having a flow axis comprising a one piece flow obstruction body having an upstream facing surface and a downstream facing surface, said upstream facing surface having a perimeter shape generally corresponding to the cross sectional shape of a conduit in which the body is to be mounted, said body being substantially imperforate and having a length measured along the flow axis less than its smallest transverse dimension measured generally perpendicular to the flow axis, a first bore in the body open to the upstream facing surface, a second bore in the body open to the downstream facing surface, means to mount said body in position to receive impingement of the fluid stream on the upstream facing surface, and means to sense the differential in pressures between the first and second bores to determine the relative rate of movement of the fluid stream.

2. The combination as specified in claim 1 wherein the conduit is circular in cross section and the upstream facing surface of the flow obstruction body has a diameter less than 0.8 of the diameter of said conduit.

3. The combination as specified in claim 1 wherein said flow obstruction body is positioned substantially centered along the flow axis of said conduit.

4. The combination as specified in claim 1 and strut means to mount said flow obstruction body relative to said flow conduit with the flow obstruction body spaced from the walls of the flow conduit, said means to sense including a separate passageway open to the first and second bores, respectively, and through the strut means to the exterior of the conduit.

5. The flowmeter of claim 1 wherein said means to sense includes pressure sensing separate passageway means in the flow obstruction body open to each of the first and second bores, and a differential pressure sensor connected to the respective passageway means.

6. A target flowmeter for use to measure fluid flow in a conduit comprising a generally flat plate-like unitary target body having an outer peripheral edge defining first and second surfaces of substantially the same size and of substantial width in relation to the length of the target body in flow direction, strut means substantially narrower than the width of the target body to mount said target body in position in the conduit so that the flow to be measured impinges on substantial portions of said first surface and passes around the majority of the peripheral edge of said target body, said second surface having at least portions which face in downstream direction of the fluid flow, a first bore defined in said target body and opening to the first surface, a second bore separate from the first bore defined in said target body and opening to the second surface, and a pair of separated passageways defined in said target body and open to the first and second bores, respectively, said passageways opening through the means to mount to the exterior of the conduit and being adapted to be coupled to means to sense the differential in pressure of the bores to indicate the rate of fluid flow relative to the target body.

7. A target flowmeter according to claim 6 and a particle deflector means mounted to the target body in position to shield the target from direct particle impingement, said deflector means being mounted to permit the pressure of the fluid to act on said portion of said first surface.

8. The target flowmeter according to claim 6 and a particle deflector means mounted to the target body in position to shield the first bore from direct impingement of particles carried by the fluid, said deflector means being mounted to permit the pressure of the fluid to act on said first bore.

9. A target flowmeter for use to measure fluid flow in a conduit comprising a target body having first and second surfaces, means to mount said body in position so that the flow to be measured impinges on at least portions of said first surface and passes around said target body, said second surface having at least portions which face in downstream direction of the fluid flow, a counterbore defined in said first surface, a purge passageway open between said counterbore and said second surface to permit fluid suspended particles entering the counterbore to be discharged through the purge passageway, and means to sense the differential in pressure between the first surface portion in the region of the counterbore and the second surface portion to indicate the rate of fluid flow relative to the flow obstruction body.

10. A target flowmeter for use to measure fluid flow in a conduit comprising a unitary plate-like target body having first and second surfaces and being substantially impervious to flow through the target body between the first and second surfaces, means to mount said target body in position substantially centered in the conduit so that the flow to be measured impinges on at least portions of said first surface and passes around said target body, said second surface having at least portions which face in downstream direction of the fluid flow, a first bore defined in said target body and opening to the first surface, a second bore separate from the first bore defined in said target body and opening to the second surface, and a pair of separated passageways defined in said body and open to the first and second bores, respectively, said passageways opening through the means to mount to the exterior of the conduit and being adapted to be coupled to means to sense the differential in pressure of the bores to indicate the rate of fluid flow relative to the target body.

* * * * *